United States Patent [19]
Olsen

[11] 3,795,073
[45] Mar. 5, 1974

[54] COLLAPSIBLE TRAP FOR CRABS AND THE LIKE

[75] Inventor: Robert J. Olsen, Seattle, Wash.

[73] Assignee: Northwest Wire Works, Inc., Seattle, Wash.

[22] Filed: Mar. 23, 1972

[21] Appl. No.: 237,384

[52] U.S. Cl............................ 43/105, 43/100
[51] Int. Cl............................... A01k 69/08
[58] Field of Search....... 43/100, 101, 103, 105, 66; 119/2

[56] References Cited
UNITED STATES PATENTS
| | | | |
|---|---|---|---|
| 2,516,658 | 7/1950 | Stelly | 43/100 |
| 3,678,612 | 5/1970 | Hendrickson | 43/105 X |
| 3,373,523 | 3/1968 | Olafson | 43/100 |
| 1,185,798 | 6/1916 | Hofer | 43/100 X |
| 2,760,297 | 8/1956 | Buyken | 43/105 |

FOREIGN PATENTS OR APPLICATIONS
| | | | |
|---|---|---|---|
| 49,964 | 12/1917 | Sweden | 43/105 |

Primary Examiner—Louis G. Mancene
Assistant Examiner—J. N. Eskovitz

[57] ABSTRACT

Two opposite sides of a rectangular trap are hinge connected to both the top and bottom of the trap. The remaining two sides are hinge connected to only the bottom and are adapted to be folded inwardly into a position flat against the bottom. Then, the top and one of the double hinged sides are folded downwardly onto the bottom and the remaining double hinged side. A framed tunnel opening is provided in each side for receiving a removable rigid wire tunnel.

9 Claims, 9 Drawing Figures

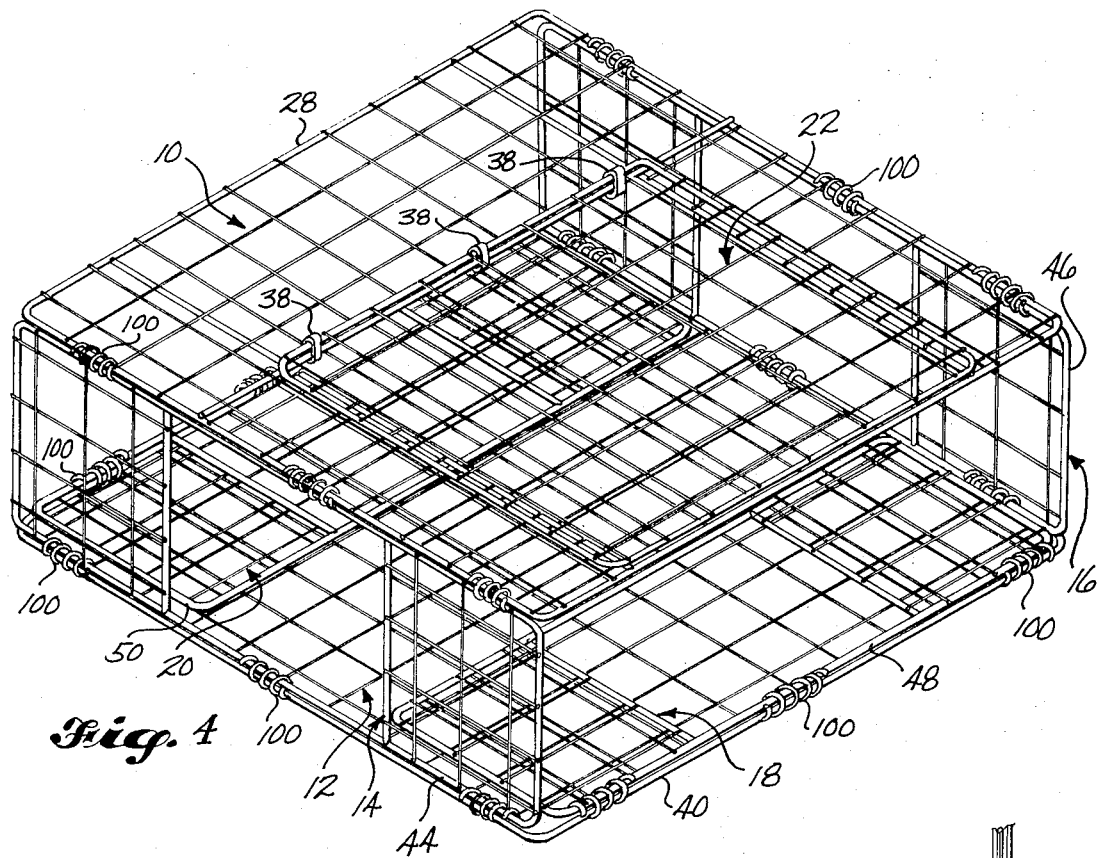
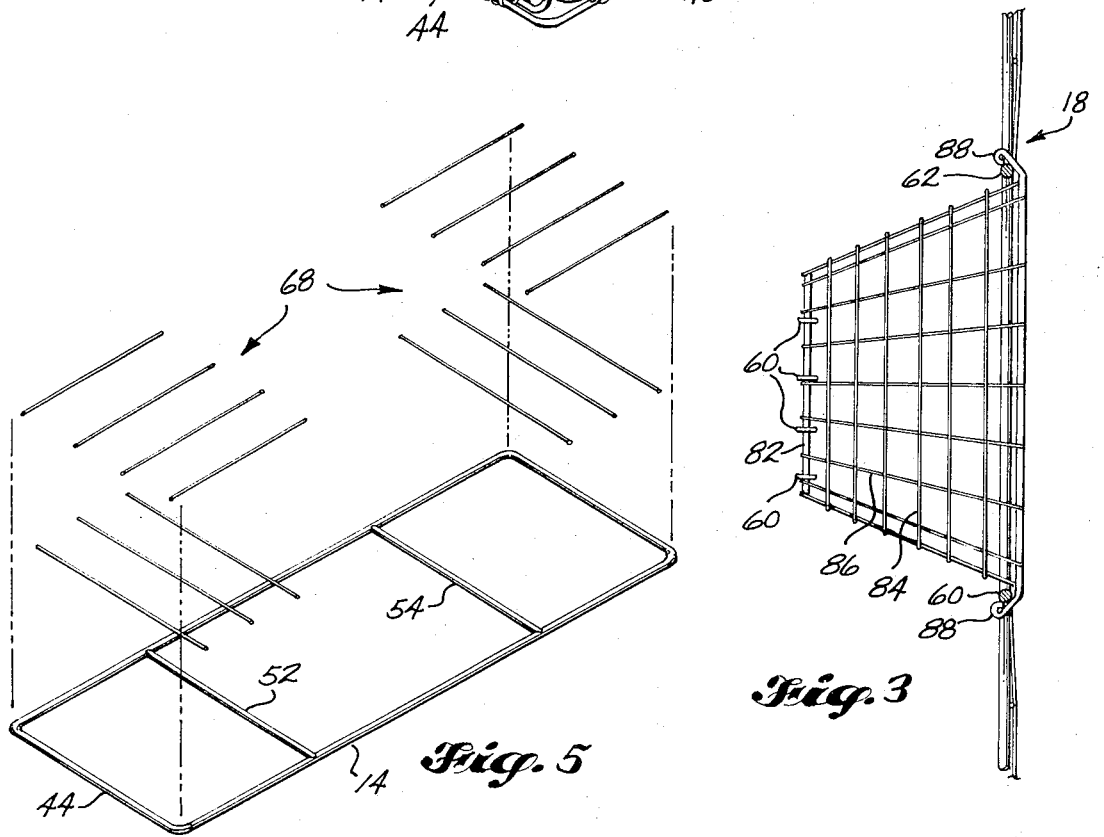

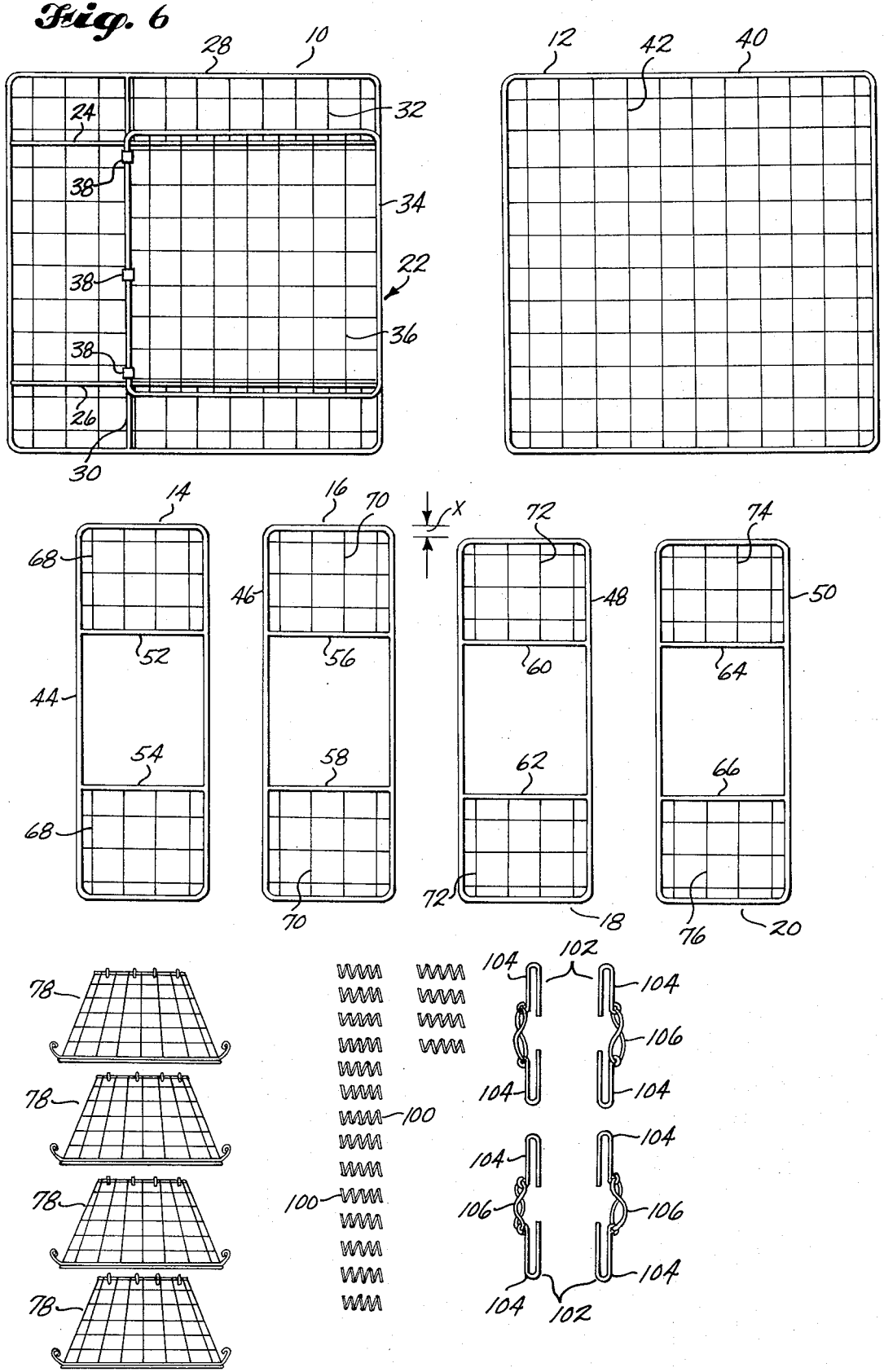

COLLAPSIBLE TRAP FOR CRABS AND THE LIKE

BACKGROUND OF THE INVENTION

1. Field of the Invention

This invention relates to traps for catching crabs or the like. More particularly, it relates to economical traps which are collapsible into a flat compact package for storage.

2. Description of the Prior Art

Various types of collapsible crab traps have been proposed. Examples of known traps are disclosed by U.S. Pat. No. 1,146,698, granted July 13, 1915, to Robert M. Franklin; by U.S. Pat. No. 2,760,297, granted on Aug. 28, 1956 to Frank E. Buyken; by U.S. Pat. No. 2,769,274, granted Nov. 6, 1956, to Nels M. Ougland, and by U.S. Pat. No. 3,373,523, granted on Mar. 19, 1968 to Theodore Olafson. A disadvantage of these prior art traps is that they cannot be economically manufactured.

SUMMARY OF THE INVENTION

This invention relates to the provision of a collapsible trap for crab or the like which can be economically manufactured by utilization of modern wire basket technology, involving machine forming, assembly and welding of wire hoops and rods. The trap of this invention is an outgrowth of some work I did in helping to develop a folding fish trap which is disclosed in the Dec. 4, 1970, publication of the National Marine Fisheries Service, by Fred W. Hipkins and Alan J. Beardsley.

According to the present invention, the trap is made rectangular in form and comprises a top panel, a bottom panel and four side panels. Two oppositely situated side panels are hinge connected to both the top panel and the bottom panel. The remaining two side panels are hinge connected to only one of the top and bottom panels. They are also properly sized so that they can be freely swung inwardly into a position flat against the panel to which they are connected. The top panel, the bottom panel and the double hinge side panels are adapted to be collapsed into a flat position, with the two single hinged side panels inside.

Each of the six wall panels comprises a closed metal wire frame forming its periphery. At least one (but preferably all) of the side panels includes a tunnel opening defined by only opposite side portions of its peripheral main frame and a single pair of perpendicular intermediate frame rods. A removable rigid metal wire tunnel is insertable into each tunnel opening. Each tunnel comprises a closed loop entrance frame of wire which adds rigidity to its side panel. In a preferred form of the invention the six panels of the trap are secured together in a rectangular box forming spaced relationship by means of only four corner placed elastomeric straps. When the panels are in such box forming relationship the main frames of the six panels provide a pair of frame members along each edge of the trap. Collectively the panel main frames form a simple skeletal structure which renders the trap economical to manufacture while at the same time is quite structurally adequate.

This invention also relates to certain more detailed constructional features of the trap which are described in detail in the description of the illustrated embodiment which follows.

BRIEF DESCRIPTION OF THE DRAWINGS

FIG. 3 is a fragmentary sectional view taken substantially along line 3—3 of FIG. 2, showing one of the tunnels in top plan;

FIG. 4 is a view similar to FIG. 1, but showing all four tunnels removed, the top down, and the two single hinged side walls swung inwardly, preparatory to collapsing the remaining walls of the trap;

FIG. 5 is an exploded isometric view of one of the side panels;

FIG. 6 is a view showing all components of the trap separated from each other;

DESCRIPTION OF THE PREFERRED EMBODIMENT

Figure 1:
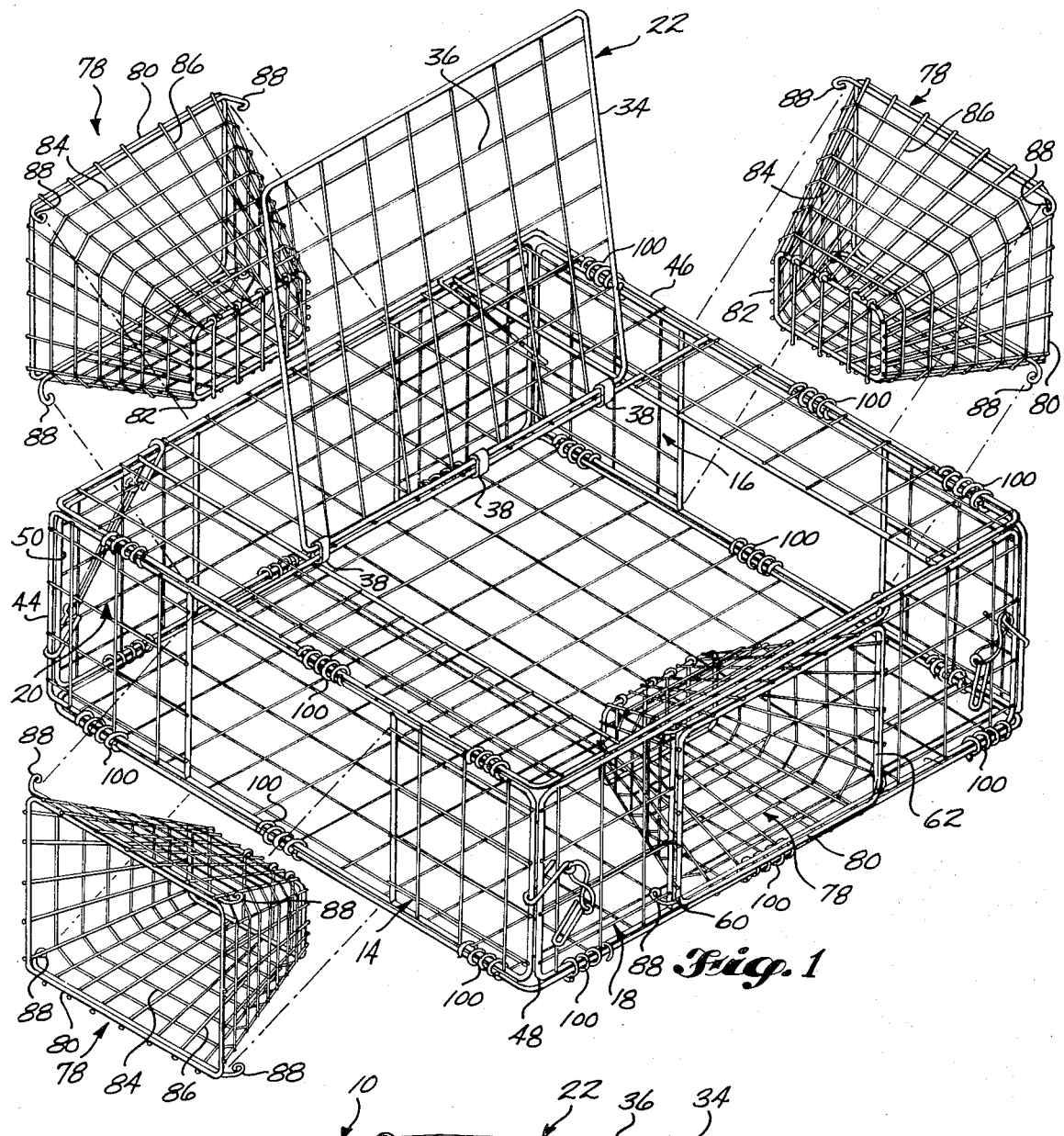
FIG. 1 is an isometric view of a crab trap embodying principles of the invention, taken from above and looking towards the top and two sides of the trap, showing three of the removable tunnels in spaced relationship outwardly from the openings provided therefor in the side panels of the trap, and also showing the catch removal door swung upwardly into an open position.

Referring to the several figures of the drawing, the preferred form of trap basically comprises a top panel 10, a bottom panel 12, two double hinged side panels 14, 16, and two single hinged side panels 18, 20. The trap also includes means for hinge connecting such panels 10, 12, 14, 16, 18, 20 together in such a manner that they can be folded or collapsed into a substantially flat condition and connector means for securing them together into a rectangular box forming spaced relationship, as will hereinafter be described in detail.

As most clearly shown by parts FIG. 6, each of the panels 10, 12, 14, 16, 18, 20 comprises a rectangular metal wire main frame at its periphery, giving it "hoop" strength. The top panel 10 supports a door 22. The door 22 closes a catch removal opening in the top panel 10. This opening is defined at its sides by a pair of spaced apart, parallel, intermediate frame rods 24, 26. These rods 24, 26 are rigidly interconnected between opposite side portions of the main frame 28. The opening is defined at its inner end by a cross rod 30 which is rigidly interconnected between the two remaining sides of the frame 28. At its outer end the opening is defined by the side portion of frame member 28 which extends between the intermediate rods 24, 26. Thus, the opening is itself framed by the relatively heavy duty wire or rod material from which the various frame members are made. The regions of the top panel 10 outwardly of the intermediate frame rods 24, 26, 30 are closed by wire mesh material.

The door 22 comprises a rectangular frame 32 at its periphery and mesh material 36 inwardly of said frame 32. The door 22 is hinge connected at its rear to the intermediate portion of rod 30, such as by the use of a plurality of strap hinges 38, or the like. The opening and its door are intentionally offset and the door 22 is intentionally hinged at its inner end. These things are done so that the frame member at the free end of the door 22 is in juxtaposition with a side portion of main frame 28. The importance of this arrangement is discussed below.

The bottom panel 12 also comprises a main frame 40 the confines of which are closed by wire mesh material 42. As illustrated, top panel main frame 28 and bottom panel main frame 40 are substantially equal in size.

For purposes of this description two of the side panels, designated 14 and 16 in the drawing, will be referred to as the "double hinged" side panels. The remaining two side panels, designated 18 and 20, will be referred to as the "single hinged" side panels.

The side panels 14, 16, 18, 20 each comprises a rectangular metal wire main frame at its periphery, respectively designated 44, 46, 48, 50. Each side panel 14, 16, 18, 20 also includes a pair of spaced apart, parallel, intermediate frame rods, respectively designated 52, 54; 56, 58; 60, 62 and 64, 66. In each side panel the intermediate frame rods and intermediate side portions of the main frame define an opening for receiving an entrance tunnel 78. The tunnels 78, which will hereinafter be described in detail, are all identical and are interchangeable. Therefore, the tunnel receiving openings are made equal in size.

The single hinged side panels 18, 20 are shorter than the double hinged side panels 14, 16, by an amount X (see FIG. 6) which is preferably slightly larger than twice the thickness of the main frame forming wire (e.g., about one-half inch). The regions of the side panels 14, 16, 18, 20 outwardly of the tunnel receiving openings are closed by wire mesh 68, 70, 72, 74. FIG. 5 shows the preferred construction of the side panels with panel 14 being chosen to serve as an example. A length of relatively heavy wire is bent into a rectangular form and its two ends are welded together to form a frame 44. The rods 52, 54 are then accurately welded into place within the frame 44. The wire mesh sections 68 are formed from perpendicular sets of relatively light weight wire lengths which are set into place and then machine spot welded to each other and to the frame members.

Referring to FIG. 1, the preferred form of tunnel 78 comprises a rectangular entrance and exit frames constructed from relatively heavy gauge metal wire. A plurality of relatively light gauge wire hoops, some of which are designated 84, are spaced apart between the entrance and exit frames 80, 82. The end frames 80, 82 and these intermediate hoops 84 are connected together by a plurality of longitudinal wire members, some of which are designated 86. The wire hoops progressively decrease in size from the large dimension entrance frame 80 down to the small dimension exit frame 82. The entrance frame 80 is sized to closely match the dimensions of a side panel tunnel opening. In the illustrated embodiment each tunnel 78 is provided with a pair of upper and lower horizontal rods having hooks 88 at their ends. When a tunnel 78 is within a tunnel opening the hooks 88 may engage upper and lower portions of the frame rods 52, 54; 56, 58; 60, 62 and 64, 66. The ends of the hooks 88 are curled inwardly so that a rounded cam surface is presented which may be pressed against the tunnel opening defining rods (i.e. the tunnel opening frame). When the tunnels 78 are pushed inwardly the rounded ends of the hooks 88 cam themselves past the rods 52, 54; 56, 58; 60, 62 and 64, 66 until they are behind such rods. Tension members, such lengths of elastic material 90 having hooks 92 at their opposite ends, may be intalled between opposite tunnels 78, to help retain such tunnels 78 in place.

Figure 2:
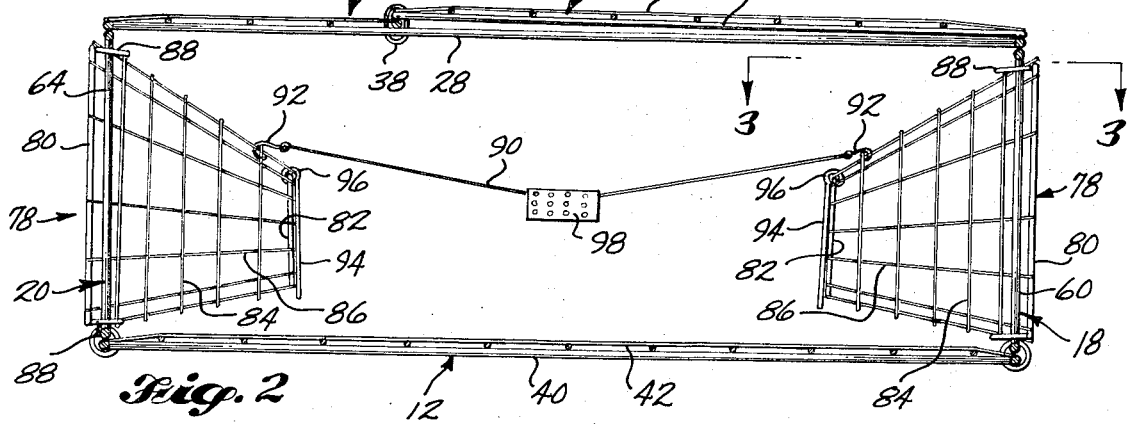
FIG. 2 is a longitudinal sectional view taken through the trap of FIG. 1, showing the door closed and the side tunnels in place, such view omitting the background wall and tunnel for simplicity of illustration.

As best shown by FIG. 2, all four tunnel walls 78 converge from the outer to the inner ends of the tunnels 78 so that the bottom panel or runway of the tunnel 78 is elevated above the bottom of the trap at the inner end of the tunnel 78. The inner end of the tunnel is spaced below the plane of the trap top panel 10. The angle deflection of the floor of each tunnel 78 from the plane of the trap bottom panel 12 is relatively small so that a crab or the like entering the tunnel does not have to climb a steep slope.

Crabs, etc. which have entered the trap are prevented from escaping back through the tunnels 78, by means of guards provided at the inner ends of the tunnel 78. Each tunnel guard may comprise a plurality of vertical rods 94 having an eye portion 96 formed at its upper end. The eye portions 96 loosely surround the upper portions of the exit frames 82. The tunnel guards 94, 96 normally hang in the positions shown in FIG. 2. The guards 94, 96 can be freely moved pivotally away from the exit frames 82 of the tunnel 78 by the crabs, etc. as they enter the trap. Since the guards 94, 96 can only pivot inwardly they serve to block the exit openings and prevent the crabs, etc. from leaving the trap back through the tunnels 78. Preferably, the exit frames 82 are set to lean outwardly a slight amount from vertical so that gravity will hold the guards 94, 96 against the exit frames 82.

By way of typical and therefore nonlimitive example, one of the tension straps 90 may be used for supporting a bait box 98. The bait box 98 has foraminous side walls so that bait juices can be leached out from a suitable bait (e.g., clams) placed in the box 98 for attracting the crabs, etc.

The double hinged side panels 14, 16 are positioned opposite each other and are hinge connected along their upper boundaries to the adjoining side boundary of the top panel 10, and along their lower boundaries to the adjoining lower boundaries of the panel 12, such as by means of a plurality of coil type hinges 100. Installation of the hinge coils 100 involves first bringing together the main frame members which are to be connected. Then such members are together moved into the space between one end of a coil and the first full loop. Then the coil 100 is rotated and in that manner screwed onto the two frame members. The center opening through the coil member 100 is large enough so that both frame members are loosely accomodated within such opening. Thus, unless restrained each hinged panel is freely swingable relative to the panel to which it is connected.

The shorter single hinged side panels 18, 20 are each hinge connected to only the bottom panel 12. This is so that they can be swung inwardly and laid flat against the mesh 42 of the bottom panel 12, as is explained below.

To form an operative trap the several panels 10, 12, 14, 16, 18, 20 are connected together into a rectangular box forming spaced relationship. Preferably this is done by use of only four corner straps 102. As best shown by FIG. 6, each corner strap 102 may comprise a pair of elongated U-shaped end hooks 104 interconnected by an elastic band 106. Referring now to FIG. 1 the hook 104 of one of the connectors 102 is brought into engagement with adjacent lower end portions of the side panel main frames 44, 50. Such connector 102 is then stretched and its second hook is engaged about adjacent portions of the main frames 28, 50 for the top panel 10 and side panel 20, respectively, at a location spaced inwardly from the corner of the trap. In like fashion the remaining three connectors 102 are installed at the other three corners of the trap. However, on the side of the trap whereat the free end of the door 22 rests on a part of the top panel frame 28, the hooks 104 are additionally brought into engagement with the door frame 34. In this manner two of the connectors 102 further serve to secure the door 22 shut, making it unnecessary to provide an additional connector means for this purpose.

When the connectors 102 are all installed the panels 10, 12, 14, 16, 18, 20 form a rigid box-like structure. The corner and edge boundaries of such box are defined by the peripheral frames of the several panels 10, 12, 14, 16, 18, 20. Two frame rods of such frames exist at each corner of the trap and altogether they form the skeletal structure for the trap. Such skeletal structure is quite simple in nature while at the same time is quite structurally adequate. The tunnel openings are simply defined by means of only a single pair of additional frame rods in combination with side portions of the main frames. The tunnels themselves are constructed from a minimal number of parts, with the only heavy guage parts used being the two end frames 80, 82. When the tunnels 78 are installed the entrance frames 80 are placed contiguous the frame members which define the tunnel openings. When in place the entrance frames 80 provide bracing support for the side panels 14, 16, 18, 20.

Figure 7:
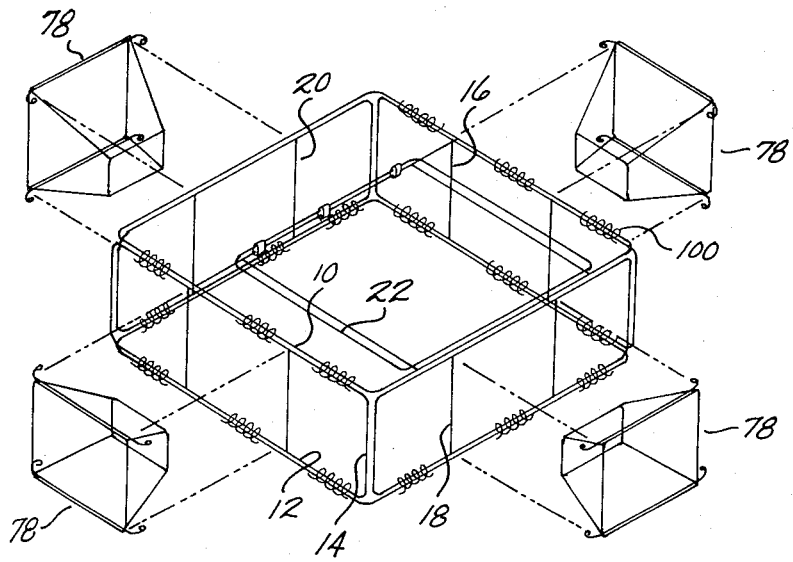
FIG. 7 is a schematic view of the trap assembled but with the tunnels removed.
Figure 8:
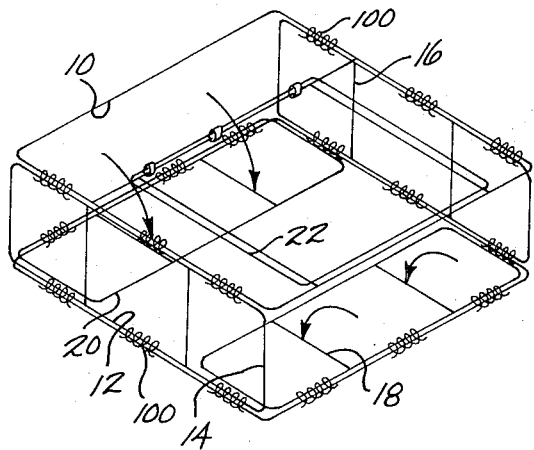
FIG. 8 is a view similar to FIG. 7, but showing the two single hinged sides of the trap folded inwardly on top of the bottom panel.
Figure 9:
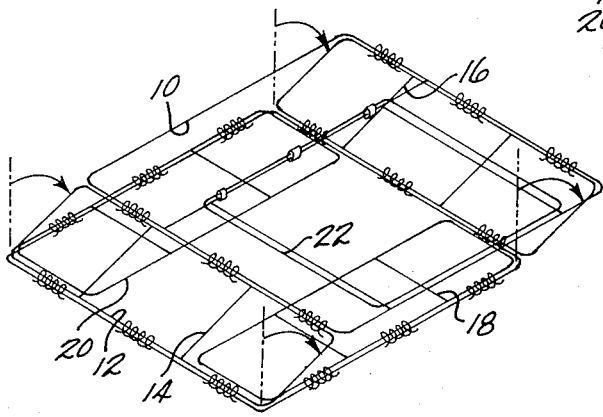
FIG. 9 is a view similar to FIGS. 7 and 8, but showing one of the double hinged side panels and the top panel being collapsed downwardly towards a position in which they are generally against the second double hinged side panel and the bottom panel.

The traps are set from a deck of a vessel and are allowed to stay in the water for a period of time. Then, the traps are removed from the water, one by one. Door 22 is opened and the catch is removed from the trap. If fishing is to continue, the door is closed and locked and the trap is reset. When it is desired to store a trap in a collapsed condition, its tunnels 78 are all removed (FIG. 7). The tunnels 78 are stacked one on top of another, in nesting fashion, to be stored in this manner. The connectors 102 are then removed from the traps. Next, the short side panels 18, 20 are swung inwardly into the interior of the trap (FIG. 8). When this is done there is no longer any support for the top panel 10 and the remaining (i.e., the double hinged) side panels 14, 16. These components are collapsed into position which places one of such side panels 14, 16 and the top panel 10 down flat against the two short side panels 18, 20, the bottom panel 12, and the other double hinged side panels 14, 16 (FIG. 9). The connectors 102 can now be reinstalled for securing the several panels together while in the collapsed position. For example, one hook can be installed onto a mesh portion of the top panel, the strap being brought over the edge of the frames, and the second hook installed onto a mesh portion of the bottom panel.

The panel and tunnel portions of the trap are preferably galvanized or otherwise coated for the purpose of protecting against corrosion. The hinges 100 may be made from a soft iron material which will easily rust. This will require replacement of such hinges 100 from time to time during normal use of the trap. However, if for some reason the trap becomes unrecoverable, the hinges 100 will rust within a short time to the point that they will fall apart and cease to be connectors. This is important because it will result in the trap coming apart in the water and ceasing to be a trap. If it were not for this feature, it is quite possible (and probable) that the trap would become a perpetual death trap. Crabs, etc. would continue to enter the trap, first after the bait in the bait box, and then after previously caught crabs, etc. in the trap.

The mesh size of the various mesh regions is dictated by the animal being trapped. When the trap is used for catching crabs a mesh size substantially equal to the minimal legal size for crabs is used (presently about 4⅛ inch per side).

Obviously, changes may be made in the form, dimensions and arrangement of the parts of the trap without departing from the principle of the invention. It is to be understood that the foregoing description is merely a description of a preferred embodiment of the invention, and that the invention is to be limited only by the scope of the following claims.

What is claimed is:

1. A collapsible trap of rectangular form comprising top and bottom panels, a first side panel which is hinge connected to both of said top and bottom panels, and a second side panel which is disposed opposite said first side panel and is also hinge connected to both of said top panel and bottom panels, such arrangement enabling the top panel and one of said side panels to be collapsed into a position generally against the bottom panel and the other said side panel; and the improvement comprising: third and fourth side panels, each of which is hinge connected to only one of the panels bounding it and is of proper size to be folded inwardly against such bounding panel, releasible connector means for securing said top, bottom and side panels together in a rectangular box forming spaced relationship, at least one of said side panels including an opening therein for receiving a rigid tunnel, and a rigid tunnel insertable into and removable out from said opening, said tunnel including means for holding it in place in said opening and wall means defining a through passageway having entrance and exit openings at its respective ends, each said panel comprising a rectangular metal wire main frame at its periphery and barrier forming wire mesh inwardly of said main frame, and each tunnel supporting side panel further comprising a pair of spaced apart intermediate frame rods rigidly interconnected between upper and lower portions of such panel's main frame, said frame rods and the upper and lower portions of the main frame extending therebetween together defining the tunnel opening, said wire mesh forming barrier areas on each side of the tunnel opening.

2. A trap according to claim 1, wherein each said releasible connector means comprises a tension strap having a first hook at one of its ends which engages and holds together adjoining end portions of the side panel main frames and a second hook at its opposite end which engages adjoining main frame portions of both an unhinged side of the third side panel and the top or bottom panel adjacent thereto.

3. A trap according to claim 1, wherein said top panel further comprises a pair of spaced apart intermediate frame rods rigidly interconnected between opposite portions of the nonhinged sides of its main frame, and a door supporting intermediate rod rigidly interconnected between opposite portions of the hinged sides of its main frame, said rods together and with a portion of the main frame extending between the two intermediate frame rods defining a removal opening, said wire mesh forming barrier areas outwardly of said opening, between the main frame and said rods, and a door for said opening comprising a metal wire main frame at its periphery and barrier forming wire mesh inwardly of such main frame, and means hinge connecting a side portion of said main frame to said door supporting intermediate rod.

4. A trap according to claim 3, wherein said releasible connector means comprises a tension strap having a first hook at one of its ends which engages and holds together adjoining end portions of the side panel main frames and a second hook at its opposite end which engages adjoining main frame portions of the top panel, in the region thereof bordering the removal opening, and adjoining portions of the door and the main frame of the adjoining side panel.

5. A trap according to claim 1, wherein each of the four side panels includes an opening for receiving a rigid tunnel, and a rigid tunnel of the character described is removably secured in each such opening.

6. A trap according to claim 5, wherein each panel comprises a rectangular metal wire main frame at its periphery, and barrier forming wire mesh inwardly of said main frame, and wherein each said side panel further comprises a pair of spaced apart intermediate frame rods rigidly interconnected between upper and lower portions of such panels main frame, said frame rods and the upper and lower portions of the main frame extending therebetween together defining the tunnel opening, said wire mesh forming barrier areas on each side of the tunnel opening.

7. A trap according to claim 6, wherein each said releasible connector means comprises a tension strap having a first hook at one of it ends which engages and holds together adjoining end portions of the side panel main frames and a second hook at its opposite end which engages adjoining main frame portions of both an unhinged side of the third side panel and the top or bottom panel adjacent thereto.

8. A trap according to claim 7, wherein said top panel further comprises a pair of spaced apart intermediate frame rods rigidly interconnected between opposite portions of the nonhinged sides of its main frame, and a door supporting intermediate rod rigidly interconnected between opposite portions of the hinged sides of the main frame, said rods and portions of the main frame extending between the two intermediate frame rods all together defining a catch removal opening, said wire mesh forming barrier means outwardly of said catch opening, between the main frame and said rods, and a door for said catch opening comprising a metal wire main frame and its periphery and barrier forming wire mesh inwardly of such main frame, and hinge means hinge connecting a side portion of said door main frame to said door supporting intermediate rod.

9. A trap according to claim 8, wherein said releasible connector means comprises a tension strap having a first hook at one of its ends which engages and holds together adjoining end portions of the side panel main frames and a second hook at its opposite end which engages adjoining main frame portions of the top panel, in the region thereof bordering the removal opening, and adjoining portions of the door and the main frame of the adjoining side panel.

* * * * *